United States Patent

Pridham et al.

[11] Patent Number: 5,845,872
[45] Date of Patent: *Dec. 8, 1998

[54] METHOD AND ARRANGEMENT FOR FASTENING COMPOSITE AIRCRAFT SKINS

[75] Inventors: Barry J Pridham; Austyn C Stephens; Christopher C.R. Jones, all of Hants, United Kingdom

[73] Assignee: British Aerospace Plc, Farnborough, England

[*] Notice: This patent issued on a continued prosecution application filed under 37 CFR 1.53(d), and is subject to the twenty year patent term provisions of 35 U.S.C. 154(a)(2).

[21] Appl. No.: 460,719

[22] Filed: Jun. 2, 1995

[30] Foreign Application Priority Data

Jun. 2, 1994 [GB] United Kingdom .................... 9411006

[51] Int. Cl.⁶ ................................ B64C 1/12; H02H 1/04
[52] U.S. Cl. .......................... 244/1 A; 244/132; 361/117; 361/218
[58] Field of Search ..................................... 244/1 A, 132, 244/131, 121, 133; 361/117, 216, 218; 411/372, 373, 395

[56] References Cited

U.S. PATENT DOCUMENTS

| | | | |
|---|---|---|---|
| 3,755,713 | 8/1973 | Paszkowski | 244/1 A |
| 3,989,984 | 11/1976 | Amason et al. | 244/1 A |
| 4,479,163 | 10/1984 | Bannink, Jr. et al. | 244/1 A |
| 4,502,092 | 2/1985 | Bannink, Jr. et al. | 244/1 A |
| 4,522,889 | 6/1985 | Ebneth et al. | 244/1 A |
| 4,542,056 | 9/1985 | Anglin et al. | 361/218 |
| 4,628,402 | 12/1986 | Covey | 361/218 |
| 4,630,168 | 12/1986 | Hunt | 361/218 |
| 4,681,497 | 7/1987 | Berecz | 244/132 |
| 4,718,801 | 1/1988 | Berecz | 411/378 |
| 4,755,904 | 7/1988 | Brick | 244/1 A |
| 4,760,493 | 7/1988 | Pearson | 244/1 A |
| 4,888,451 | 12/1989 | Toni et al. | 361/218 |
| 4,912,594 | 3/1990 | Bannink, Jr. et al. | 361/218 |
| 5,499,782 | 3/1996 | Domine | 244/1 A |

FOREIGN PATENT DOCUMENTS

| | | |
|---|---|---|
| 269458 | 4/1990 | European Pat. Off. . |
| 2212580 | 3/1992 | United Kingdom . |

OTHER PUBLICATIONS

Abstract of Olson Appln PCT/US82/00885, WO 84/00255, Jan. 1984.
Abstract of Hunt Appln 86201693.8, EP 226229, Jun. 1987.
Abstract of Lindley Appln 8610119, GB 2189563, Oct. 1987.

*Primary Examiner*—Virna Lissi Mojica
*Attorney, Agent, or Firm*—Pillsbury Madison & Sutro LLP

[57] ABSTRACT

The present invention provides a method of fastening an outer composite aircraft skin (12) to an inner substructure (14), which may be the wall of a fuel tank. The method includes the steps of incorporating an electrically conductive layer (26) in an outer surface of the outer composite skin (12), inserting a bolt (11) through the electrically conductive layer (26) and the outer composite skin (12) and through the inner substructure (14), securing the bolt (11) by means of a nut (22) directly or indirectly engaging the inner surface of the inner substructure (14), and applying insulating material (34) over the head (16) of the bolt.

11 Claims, 3 Drawing Sheets

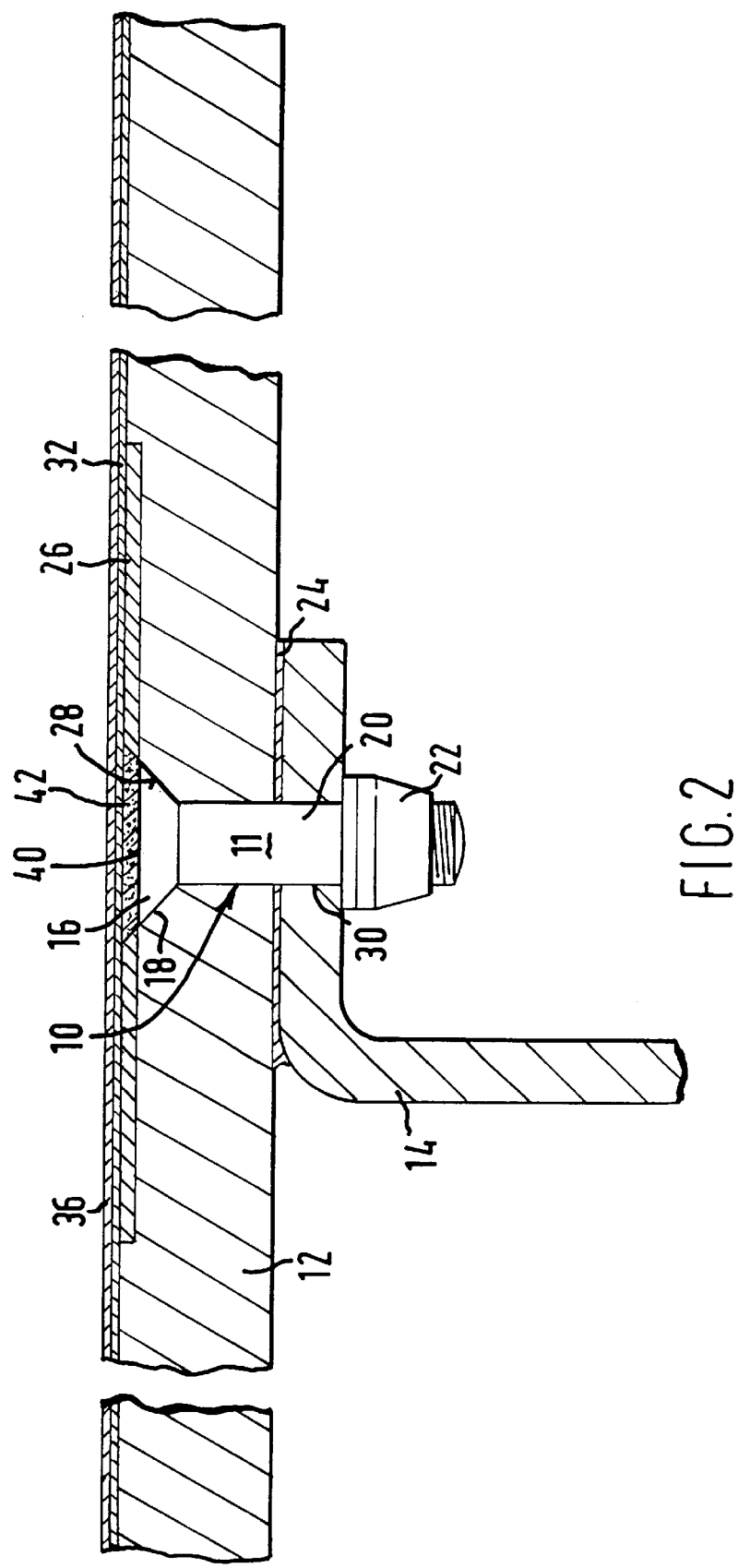

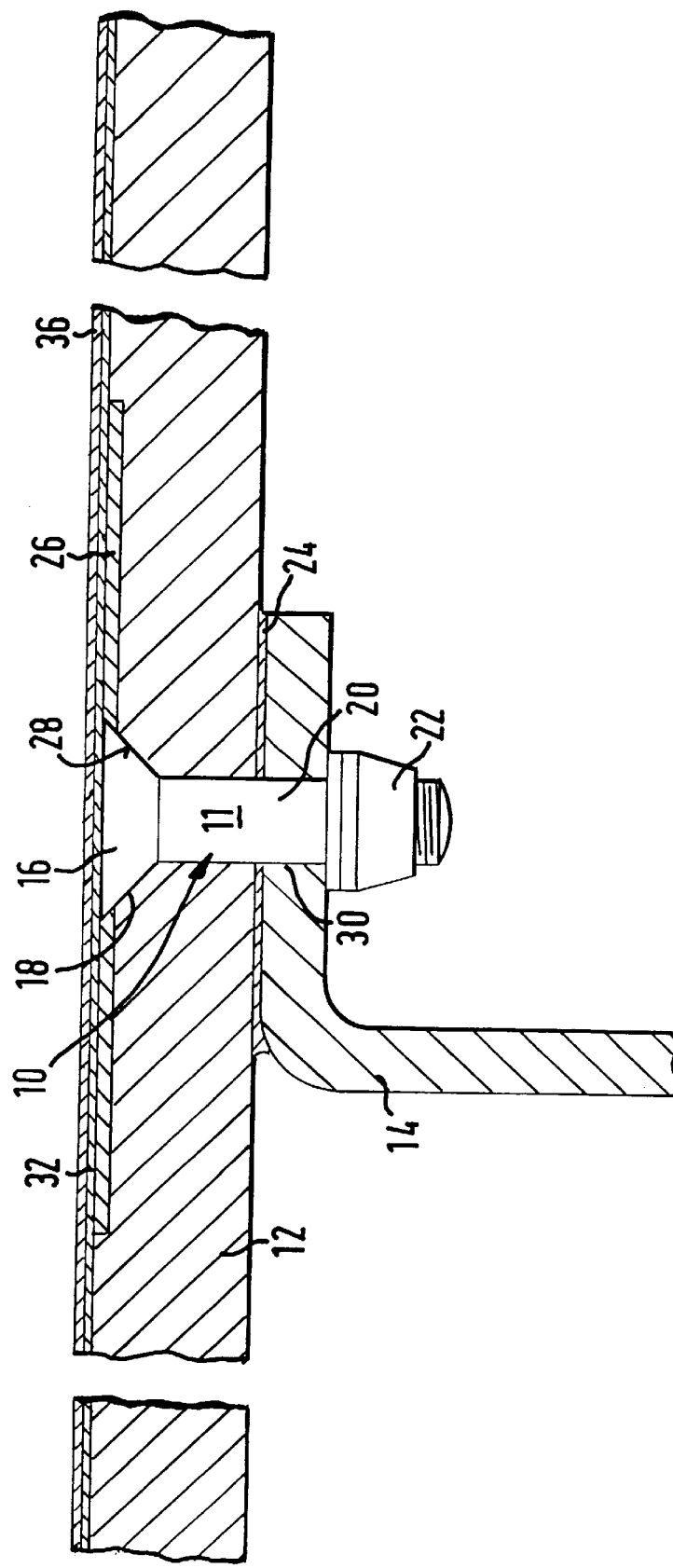

METHOD AND ARRANGEMENT FOR FASTENING COMPOSITE AIRCRAFT SKINS

TECHNICAL FIELD

This invention relates to aircraft lightning protection arrangements and more particularly to methods for fastening aircraft skin panels to an aircraft substructure, which may for example be the wall of a fuel tank, when the panels and substructure are made from composite materials such as carbon fibre composites.

BACKGROUND ART

Carbon fibre composites are being used increasingly for aircraft structures in place of the aluminium and similar metallic components formerly used. Although carbon fibre composite structures are generally stronger and stiffer than their metallic counterparts, nevertheless they lack the lightning strike tolerance of the metallic components.

A lightning strike to an aircraft causes a high electric current, which may typically be of the order of 100,000 amps, to flow through the aircraft frame. In a carbon fibre composite structure, the carbon fibre plies act as very high resistance conductors and the resin between the plies acts as highly capacitive dielectric layers so that lightning striking the carbon fibre composite results in an increasing potential difference produced across the ply structure but no readily available electrically conductive path for discharging the current. The current therefore tends to concentrate at the fasteners between the skin panels and the aircraft substructure, since the fasteners are generally made of highly conductive alloys for strength. When the lightning energy is unable to dissipate at a fast enough rate, arcing and dangerous sparks are likely to occur.

This is a considerable problem, especially when the substructure is the wall of a fuel tank and arcing carries the highly dangerous risk of injecting sparks, molten material and hot gasses into the fuel tank.

A considerable amount of research has been devoted to providing solutions to this problem but so far none has proved entirely satisfactory for purposes of practical production.

One known approach to reduce the effect of lightning strikes on non-metallic structures is to apply, by flame spraying, woven screen, foil or plating, a conductive layer such as aluminium to the outer surface of the skin panels after fastening has been completed. The fastener heads are insulated from this conductive surface layer, for example by employing a glass fibre backing for the metallic layer, which is bonded to the skin panels over the fastener heads before the application of the metallic layer. One problem with this form of protection is that a secondary bonding operation is required to bond the glass fibre backing and conductive layer to the already assembled structure and it is difficult to achieve a satisfactory bond. The protective conductive layer adds mass without contributing to the strength of the assembled structure and also is vulnerable to environmental damage and is difficult to maintain. The production and maintenance of such an arrangement is thus clearly expensive.

Another approach is to employ various special designs of fastener, for example as disclosed in our earlier patents EP-B-0269458 and EP-B-2212580. The fasteners disclosed in these patents employ a bevelled head for countersinking into the surface of the skin panel into intimate contact therewith, and a nut for securing the fastener in place, which nut is designed to transmit electric current safely to the substructure such that arcing will not occur. Again, this approach to the problem of arcing is expensive because of the need for special designs of fastener.

The present invention seeks to overcome the problems of lightning strike in a composite aircraft structure in an efficient and relatively inexpensive fashion, which does not require the use of specially designed fasteners.

SUMMARY OF THE INVENTION

According to one aspect of the present invention, there is provided a method of fastening an outer composite aircraft skin to an inner substructure including the steps of incorporating an electrically conductive layer in or applying it to an outer surface of the outer composite skin, inserting a bolt through the electrically conductive layer and outer composite skin and through the inner substructure, securing the bolt by means of a nut directly or indirectly engaging the inner surface of the inner substructure, and applying insulating material over the head of the bolt.

The insulation material may be applied in the form of an insulation strip over the outer surface of the bolt heads during the normal aircraft painting process, either before or after a primer coat. Alternatively, the bolt head may be countersunk into the outer composite skin to a depth below the level of the electrically conducting layer and the insulation material may be applied to the bolt head to be substantially flush with the outer surface of the electrically conductive layer.

The electrically conductive layer provides a conductive path to divert much of the electrical current from a lightning strike away from the fasteners, and the insulation material ensures that any arcing which does occur attaches preferentially to the electrically conductive layer rather than to the fastener and thus reduces the probability of an arc dwelling on the head of the fastener. Consequently, a substantial proportion of the lightning energy is dissipated away from the fastener and the likelihood of arcing occurring within the inner substructure is minimised, which is essential in the case of the inner substructure comprising the wall of a fuel tank.

According to another aspect of the present invention, there is provided a method of fastening an outer composite aircraft skin to an inner substructure including the steps of incorporating an electrically conductive layer in or applying it to an outer surface of the outer composite skin, inserting a bolt through openings in the electrically conductive layer and outer composite skin and in the inner substructure, wherein the bolt is an interference fit at least in the opening in the outer composite skin, and securing the bolt by means of a nut directly or indirectly engaging an inner surface of the inner substructure.

Preferably, the electrically conductive layer is a metal strip applied along rows of fastener openings in the outer composite skin.

The invention also provides a fastening obtained by the methods according the invention mentioned above.

BRIEF DESCRIPTION OF THE DRAWINGS

The invention is described further, by way of example, with reference to the accompanying drawings in which:

FIG. 2 is a cross-section through a fastener installed in an aircraft structure according to another embodiment of the present invention; and FIG. 3 is a cross-section through a fastener installed in an aircraft structure according to a further embodiment of the present invention.

DESCRIPTION OF THE PREFERRED EMBODIMENTS

Figure 1:
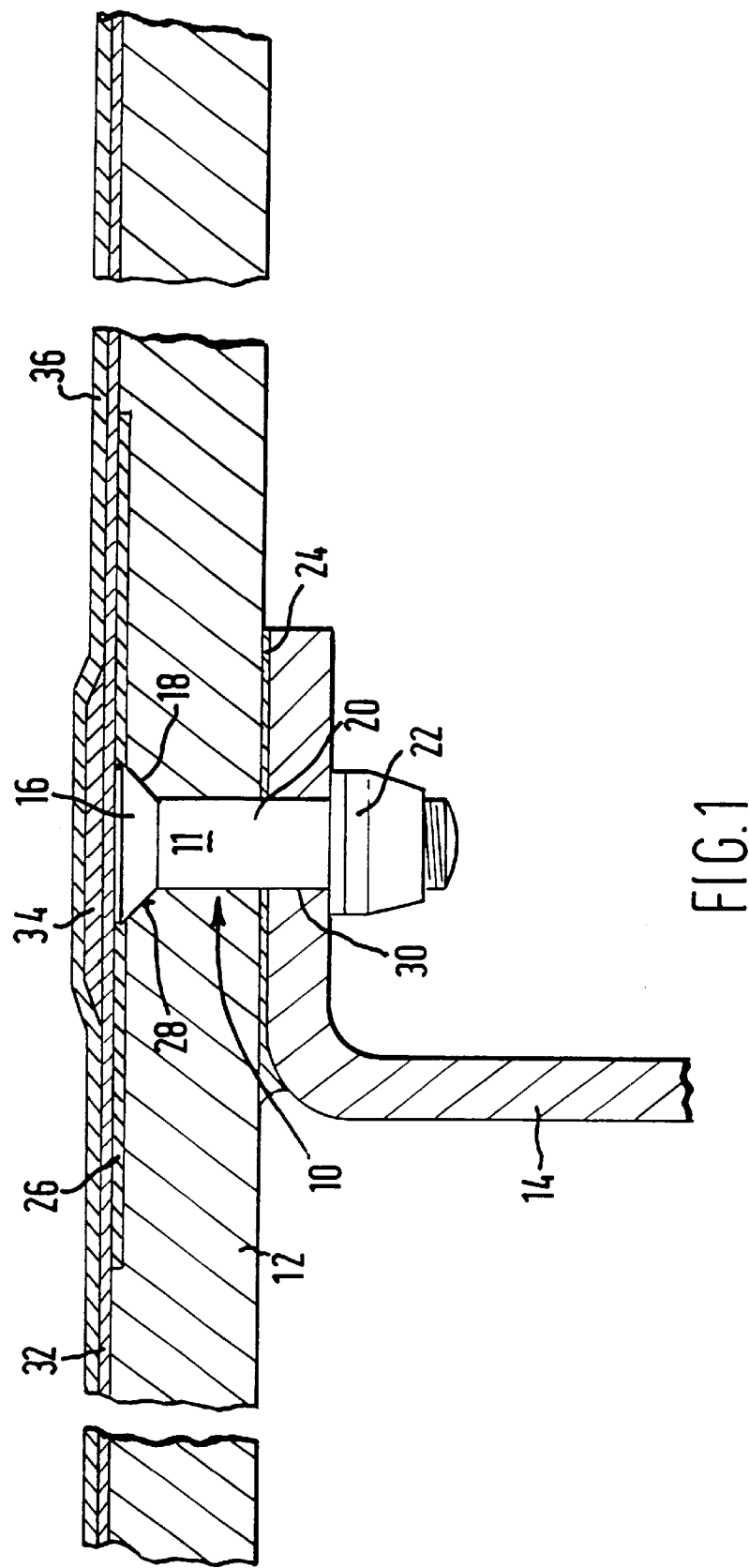
FIG. 1 is a cross-section through a fastener installed in an aircraft structure according to the present invention.

Referring to FIG. 1, a fastener 10 is shown securing a skin panel 12 of an aircraft structure to an inner substructure 14 comprising the wall of a fuel tank. Both the skin panel 12 and the substructure 14 are made of carbon fibre composite material of low weight and high strength. The fastener 10 is made of metal and comprises a bolt 11 having a bevelled head 16, which is countersunk into a correspondingly shaped opening 18 in the skin panel 12, and a shank 20, which passes through the skin panel 12 and substructure 14 to be secured by a metallic nut 22 engaging the substructure 14. An insulating shim 24 is interposed between the skin panel 12 and the substructure 14 as a filler to make up for differences in the thickness of the skin panel 12.

As shown, a metallic strip 26 is formed in an outer surface of the skin panel 12 during manufacture, and the method of fastening the aircraft structure involves inserting the bolt 11 of the fastener 10 through an opening 28 in the metallic layer 26 and remainder of the skin panel 12 and through a corresponding opening 30 in the substructure 14, following which the nut 22 is applied to the shank 20 of the bolt for securing the fuel tank in place.

Subsequently, the aircraft structure is painted and the normal primer coat 32 is applied over the outer surface of the skin panel 12, covering both the metallic strip 26 and the head 16 of the fastener 10, which is flush with the outer surface of the metallic strip 26. Next, an insulating layer 34 is applied over the primer coat 32 in the vicinity of the fastener 10 to cover the bolt head 16. Finally, the usual layer or layers 36 of paint are applied over the entire surface.

The metallic strip 26 shown here is solid and of sufficient density, i.e. overall cross-sectional area to ensure a safe conductive path to divert much of the electric current, generated by lightning strikes in use, away from the fastener 10. The insulating layer 34 ensures that any arcing occurs in the vicinity of the metallic strip rather than the bolt head 16 of the fastener 10 and assists in dissipation of the lightning energy away from the fastener 10 and hence well away from the interior of the fuel tank.

A modification of the invention will now be described with reference to FIG. 2, in which similar reference numerals have been employed for similar parts. Only the differences will be described.

In the fastening shown in FIG. 2, the head 16 of the bolt 11 of the fastener 10 is countersunk into the skin panel 12 so that its outer surface 40 lies below the outer surface of the skin panel 12, i.e. below the outer surface of the metallic strip 26. In this instance, a layer of insulating material 42 is applied over the bolt head 16 within the opening 28 to fill the remainder of the opening until the insulating layer 42 is flush with the outer surface of the skin panel 12 and with the outer surface of the metallic strip 26. Subsequently, the primer coat 32 and paint layer 36 are applied in the usual way.

The effects and benefits of the fastening obtained as shown in FIG. 2 are similar to those obtained with the fastening shown in FIG. 1.

A further modification of the invention will now be described with reference to FIG. 3. Again, similar reference numerals have been employed for similar parts and only the differences will be described.

In this instance, the bolt 11 of the fastener 10 is inserted through the metallic strip 26 and the remainder of the skin panel 23 as in the case of the FIG. 1 embodiment, and the outer surface of the head 16 is flush with the outer surface of the metallic strip 26. The fastener 10 is sized to be a tight, i.e. interference, fit within the openings 18 and 30 in the skin panel 12 and the substructure 14 respectively so that the fastener 10 is in good conductive contact with the high resistance conductive carbon fibre plies in the composite material of the skin panel 12 and the substructure 14. Additionally, the bolt head 16 is embedded within the metallic strip 26 such that a conductive path exists from the head 16 to the metallic strip 26 for the dissipation of the lightning energy.

In this embodiment, therefore, the insulation layer is omitted but the fastener 10 is in a close interference with the surrounding carbon fibre composite material and can thus tolerate the high electric current generated by lightning strikes and survive without sparking. Any sparkings that do arise and their products are unable to escape from within the openings 18 and 30 into the surrounding air, and are thereby rendered harmless. It has been found that this embodiment is practical with certain types of fastener 10.

Various modifications are possible within the scope of the invention. For example, the fastener 10 may be any conventional fastener. In the case of the illustrated bolt 11, the bolt head 16 may be flat sided and multifaceted, or it may be frustoconical; and the nut 22 may be in direct or indirect contact with the substructure 14.

Although the metallic strip 26 is shown inset into the skin panel 12, it may alternatively be applied over the outer surface of the skin panel 12 and then the fastener be inserted through both an opening in the strip 26 and an opening in the skin panel 12.

The metallic strip 26 employed in each of the described embodiments is solid but an alternative possibility is to use a strip which is substantially solid but which is pierced by occasional relative small openings so long as the density, or cross-section area, of the strip remains sufficient to establish a safe conductive path for dissipating lightning energy.

In the case of the FIG. 1 embodiment, the insulating layer 34 is shown applied over the primer coat 32 but it may alternatively be applied before and hence under the primer coat 32. The effects will be the same.

A plurality of the metallic strips 26 may be arranged to form an interconnecting grid extending both spanwise and chordwise of an aircraft panel to offer a larger metallic area over which lightening strike energy can be dissipated. In this instance, the grid may be connected to a metallic part of the structure to provide a route for the current to pass from the composite panel to a metallic structure of the aircraft.

We claim:

1. A method of fastening an outer composite aircraft skin to an inner substructure including the steps of incorporating an electrically conductive layer embedded into an outer surface of the outer composite skin, the electrically conductive layer comprising a solid or substantially solid metal strip, and inserting a bolt through the electrically conductive layer and outer composite skin and through the inner substructure and securing the bolt by means of a nut directly or indirectly engaging an inner surface of the inner substructure.

2. A method according to claim 1 further including the step of applying insulating material directly or indirectly over a head of the bolt.

3. A method according to claim 2 comprising applying an insulation strip over the outer surface of the head to provide the insulating material.

4. A method according to claim 3, including the step of painting the outer composite skin, and in which the insulation strip is applied either before or after a primer coat of paint during the painting step.

5. A method according to claim 2 comprising counter sinking the bolt head into the outer composite skin to a depth below the level of the electrically conductive layer, and applying the insulating material directly to the bolt head to be substantially flush with the outer surface of the electrically conductive layer.

6. A method according to claim 1 wherein the bolt is an interference fit into an opening in the outer composite skin.

7. A method of fastening an outer composite aircraft skin to an inner substructure including the steps of incorporating an electrically conductive layer embedded into an outer surface of the outer composite skin, said electrically conductive layer comprising a solid or substantially solid metal strip, inserting a bolt through the electrically conductive layer and outer composite skin and through the inner substructure, securing the bolt by means of a nut directly or indirectly engaging an inner surface of the inner substructure, and applying an insulating material over a head of the bolt.

8. A method of fastening an outer composite aircraft skin to an inner substructure including the steps of incorporating an electrically conductive layer embedded into an outer surface of the outer composite skin, said electrically conductive layer comprising a solid or substantially solid metal strip, inserting a bolt through openings in the electrically conductive layer and outer composite skin and in the inner substructure wherein the bolt is an interference fit at least in the opening in the outer composite skin, and securing the bolt by means of a nut directly or indirectly engaging an inner surface of the inner substructure.

9. A combination of an outer composite aircraft skin, an inner substructure, and a fastener fixing said outer skin to said inner substructure, and including an electrically conductive layer embedded into said outer skin, and wherein said fastener comprises a bolt inserted through said electrically conductive layer, said outer skin and said inner substructure and a nut on said bolt engaging directly or indirectly an inner surface of the inner substructure, and wherein said electrically conductive layer comprises a solid or substantially solid metal strip.

10. A combination according to claim 9 further including a layer of insulating material over a head of said bolt.

11. A combination according to claim 9 wherein said outer skin includes an opening and said bolt is an interference fit in said opening.

* * * * *